UNITED STATES PATENT OFFICE.

ST. JOHN O'DORIS, OF PHILADELPHIA, PENNSYLVANIA.

COMPOSITION FOR FUEL.

Specification forming part of Letters Patent No. 12,159, dated January 2, 1855.

*To all whom it may concern:*

Be it known that I, ST. JOHN O'DORIS, of the city and county of Philadelphia, and State of Pennsylvania, have invented a new and useful Composition for Fuel; and I do hereby declare that the following is a full, clear, and exact description of the composition, the proportions of its component parts, and the operation of combining them.

The nature of my invention consists in combining coal-dust or coal in small particles with coal-ashes, alumina, or other such substance as does retain caloric, sawdust, coal-tar, and vegetable matter known as "street-garbage," in the following proportions, for constituting a composition for fuel.

Proportions: seventy-five parts coal-dust, ten parts coal-ashes or alumina, five parts coal-tar, five parts sawdust, five parts street garbage, the above to be mixed cold until the parts are well incorporated, and pressed into forms.

The proportions given will produce a good article of fuel suitable for ordinary culinary and household purposes; but as a heavier, lighter, or more combustible fuel may be required for many purposes, a variation of about five per cent. in the parts will produce the desired result without essentially changing the nature of the fuel from that above described, an increase in the coal making it heavier and capable of greater intensity of heat, and a decrease producing the reverse result.

The street-garbage used in the composition of this fuel will comprise rotten leaves and wood, shavings, vegetable matter generally, and all the refuse of kitchens which is thrown into the street.

What I claim as my invention is—

The formation of an artificial fuel by the combination of street-garbage with coal-dust, coal-ashes, sawdust, and coal-tar or other bituminous substance, substantially as hereinbefore set forth.

In testimony whereof I have hereunto signed my name before two subscribing witnesses.

ST. JNO. O'DORIS.

Witnesses:
GEO. PATTEN,
SAML. GRUBB.